(12) United States Patent
Claprood

(10) Patent No.: US 6,672,914 B1
(45) Date of Patent: Jan. 6, 2004

(54) METHODS AND APPARATUS FOR MOUNTING A BUS BAR ASSEMBLY

(75) Inventor: Edward Claprood, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 181 days.

(21) Appl. No.: 09/916,842

(22) Filed: Jul. 27, 2001

(51) Int. Cl.7 ................................................ H01R 4/02
(52) U.S. Cl. ...................................................... 439/876
(58) Field of Search ........................ 439/76, 76.2, 949, 439/34; 361/395, 399, 413, 415, 627, 660; 174/70 B, 99 B, 133 B

(56) References Cited

U.S. PATENT DOCUMENTS

| 5,229,922 | A | * | 7/1993 | Muramatsu et al. ........ 361/395 |
| 5,728,975 | A | * | 3/1998 | Tanaka ..................... 174/88 B |
| 5,744,751 | A | * | 4/1998 | Kassai ........................ 174/52.1 |
| 5,923,526 | A | * | 7/1999 | Kangas ........................ 361/627 |
| 6,317,971 | B1 | * | 11/2001 | Colarusso et al. ............. 29/825 |
| 6,420,655 | B1 | * | 7/2002 | Yang et al. ................ 174/70 B |

* cited by examiner

Primary Examiner—Jean F. Duverne
(74) Attorney, Agent, or Firm—Chapin & Huang, L.L.C.; David E. Huang, Esq.

(57) ABSTRACT

A bus bar mounting system has a frame assembly and a bus bar assembly. The frame assembly includes a chassis which is mountable within an equipment cabinet, and an interlocking portion that forms a unitary member with the chassis. The bus bar assembly includes a set of bus bars, and a bus bar block. The bus bar block includes (i) a base portion, each bus bar of the set of bus bars coupling to the base portion, and (ii) an interlocking portion that is configured to interlock with the interlocking portion of the frame assembly in order to retain the bus bar assembly in a fixed position relative to the frame assembly. The interlocking portion of the bus bar block forms a unitary member with the base portion of the bus bar block.

24 Claims, 7 Drawing Sheets

METHODS AND APPARATUS FOR MOUNTING A BUS BAR ASSEMBLY

BACKGROUND OF THE INVENTION

A typical computerized system (e.g., a data storage system, a general purpose computer, a data communications device, etc.) includes a power sub-system having, among other things, a power supply and a set of bus bars, that connect the power supply to operating circuitry (e.g., one or more backplanes, circuit boards, etc.). One computerized system includes a bus bar block which holds the bus bars in place relative to each other and relative to neighboring components. In particular, the bus bar block holds the bus bars rigidly in place thus preventing the bus bars from contacting each other or contacting the neighboring components (e.g., the sides of a cabinet, a sub-frame, etc.). Without the bus bar block to rigidly hold the bus bars in place, the bus bars could move (e.g., due to vibration of the cabinet) and cause electrical damage (e.g., cause a fire due to an electrical short, cause damage to the power supply, cause damage to a neighboring circuit board, etc.).

One conventional bus bar block is a single contiguous non-conductive member which screws into a metal sub-frame of a cabinet. The bus bar block is machined and/or molded from a solid piece of plastic, and includes a main body and four tabs (one tab extending from each corner of the main body). The tabs of the bus bar block have screw holes, and the sub-frame has press-fit (or compression-fit) nuts which align with the screw holes. Accordingly, a technician can fasten the bus bar block to the sub-frame by aligning the bus bar block with the sub-frame, inserting screws through the screw holes, and screwing the tabs of the bus bar block to the sub-frame.

Before the technician fastens the bus bar block to the sub-frame, the bus bars are typically secured to the bus bar block to form a bus bar assembly (e.g., bolted to the bus bar block using nuts and bolts). The technician then positions the bus bar assembly within the cabinet and against the sub-frame making sure that each of the bus bars resides in a proper position and extends from the bus bar block to a proper location within the cabinet (e.g., to a backplane). Then, the technician'screws the bus bar block of the bus bar assembly to the sub-frame. After installation of the bus bar assembly, the technician can perform other installation duties such as attaching one or more power supplies to the bus bar assembly.

SUMMARY OF THE INVENTION

Unfortunately, there are deficiencies to conventional approaches for mounting bus bar assemblies. For example, the above-described conventional approach requires separate hardware (e.g., screws, press-fit nuts, etc.) for fastening a bus bar block of a bus bar assembly to a sub-frame. Such hardware can be expensive and cumbersome to carry or ship with the bus bar assembly prior to installation.

Furthermore, the use of separate hardware can require a significant amount of additional resources to install (e.g., tools, labor, etc.). For example, when installing a bus bar assembly manually, a technician typically must hold the bus bar assembly in place (i.e., properly align the screw holes of the bus bar block over corresponding nuts of the sub-frame) and use a screwdriver (e.g., an electric screwdriver) to screw the bus bar block into the sub-frame. This installation procedure may require a significant amount of installation time (e.g., several minutes), and may be difficult to maneuver and/or physically taxing (e.g., due to the technician having to work in a compact or cramped location within an electronic cabinet).

In contrast to the above-described conventional bus bar mounting approach, the invention is directed to techniques for mounting a bus bar assembly that is configured to interlock with a frame assembly (e.g., a sub-frame within an electronic cabinet). Such interlocking can alleviate the need for separate hardware (e.g., screws), special tools (e.g., an electric screwdriver) and substantial installation time (e.g., time to screw a bus bar block of the bus bar assembly into a sub-frame).

One arrangement of the invention is directed to a bus bar mounting system having a frame assembly and a bus bar assembly. The frame assembly includes a chassis which is mountable within an equipment cabinet, and an interlocking portion that forms a unitary member with the chassis. The bus bar assembly includes a set of bus bars, and a bus bar block. The bus bar block includes (i) a base portion, each bus bar of the set of bus bars coupling to the base portion, and (ii) an interlocking portion that is configured to interlock with the interlocking portion of the frame assembly in order to retain the bus bar assembly in a fixed position relative to the frame assembly. The interlocking portion of the bus bar block forms a unitary member with the base portion of the bus bar block. With such interlocking, separate hardware for fastening the bus bar block to the frame assembly can be unnecessary thus reducing costs and simplifying installation. Additionally, such interlocking provides a sturdy and reliable mechanism for holding the bus bar assembly in place thus preventing the bus bars from inadvertently contacting and damaging neighboring components.

In one arrangement, the interlocking portion of the bus bar block includes an outer section, and a neck section that couples the outer section to the base portion of the bus bar block. The neck section is configured to slidably engage with a groove defined by the interlocking portion of the frame assembly. As such, a technician can simply align the neck section of the bus bar block interlocking portion with the groove defined by the interlocking portion of the frame assembly, and slide the bus bar block into position.

In one arrangement, the outer section, the neck section and the base portion of the bus bar block define a rectangular-shaped notch configured to receive the a section of the interlocking portion of the frame assembly. In this arrangement, the groove defined by the interlocking portion of the frame assembly preferably has a rectangular shape. Additionally, the neck section preferably has a rectangular-shaped cross-section in order to engage with the groove to interlock the bus bar assembly with the frame assembly. Accordingly, the interlocking portions of the frame assembly and the bus bar block can work together to hold the bus bar assembly in place.

In one arrangement, the frame assembly further includes an alignment portion. A Here, the base portion of the bus bar block includes a corresponding alignment portion that aligns with the alignment portion of the frame assembly by way of an alignment pin. For example, the frame assembly can further include a spring loaded alignment pin retained by the alignment portion of the frame assembly, and the alignment portion of the base portion of the bus bar block can include a laterally extending section that defines (i) a contact surface to rest on the alignment portion of the frame assembly, and (ii) an alignment hole that receives the spring loaded alignment pin retained by the alignment portion of the frame assembly. As such, the alignment pin prevents the bus bar assembly, from rotating or pivoting about the interlocking point in a manner that could damage the bus bar assembly or the frame assembly (e.g., in a manner that could break the bus bar block or bend the frame assembly due to a technician inadvertently pushing against the bus bar assembly while installing another part of the computerized system).

The features of the invention, as described above, may be employed in computerized systems, devices and methods, and other computer-related components such as those of EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for mounting a bus bar assembly that is configured to interlock with a frame assembly (e.g., a sub-frame within an electronic cabinet). Such interlocking can alleviate the need for separate hardware (e.g., screws), special tools (e.g., an electric screwdriver) and substantial installation time (e.g., time to screw a bus bar block of the bus bar assembly into a sub-frame).

Figure 1:
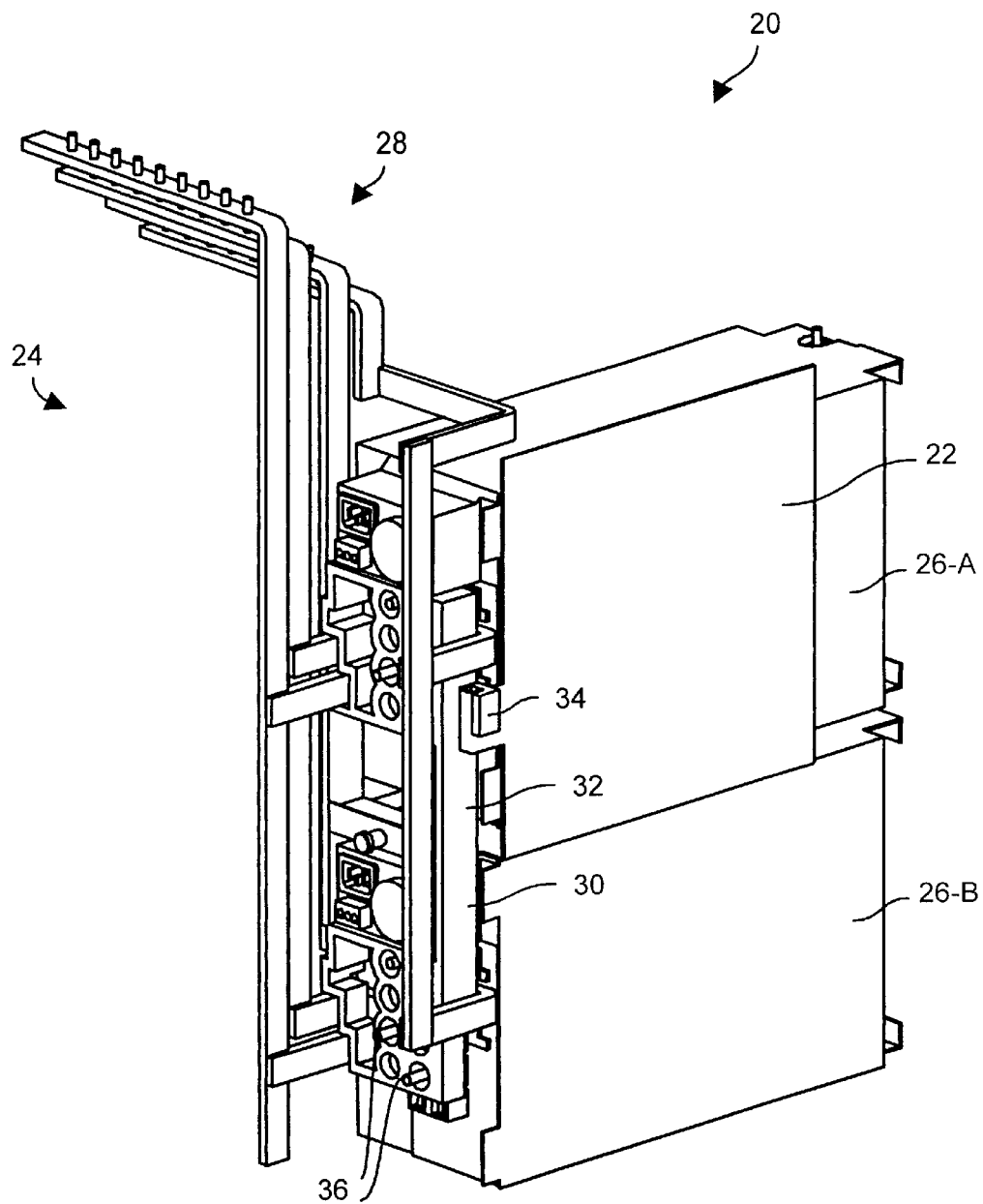
FIG. 1 is a perspective view of a bus bar mounting system which is suitable for use by the invention.

FIG. 1 shows a bus bar mounting system 20 which is suitable for use by the invention. The bus bar mounting system 20 includes frame assembly 22, a bus bar assembly 24 and a set of power supplies 26-A, 26-B (collectively, power supplies 26). The bus bar assembly 24 includes a set of bus bars 28, and a bus bar block 30. The bus bar block includes a base portion 32 and an interlocking portion 34 which is configured to interlock with the frame assembly 22 in order to retain the bus bar assembly 24 in a fixed position relative to the frame assembly 22. The interlocking of the bus bar assembly 24 with the frame assembly 22 provides a sturdy and reliable mechanism for holding the bus bar assembly 24 in place thus preventing the bus bars 28 from inadvertently contacting and damaging neighboring components (e.g., neighboring circuit boards). Furthermore, with such interlocking, separate hardware (e.g., screws, nuts, bolts, etc.) as required by conventional bus bar assemblies to mount to a sub-frame is unnecessary.

Preferably, the frame assembly 22 is a rigid structure (e.g., sheet metal) that is capable of fastening within an electronic cabinet (e.g., a computer cabinet). For example the frame assembly 22 can be part (e.g., a subassembly) of a larger assembly to which a variety of electronic components mount (e.g., one or more power supplies, backplanes, disk drive cages, card cages, control panels, a fan assembly, etc.).

The bus bar block 30 is configured to hold the set of bus bars 28 in a fixed position relative to the frame assembly 22 such that, when the power supplies 26 install within the frame assembly 22 (e.g., engages with or inserts into the frame assembly 22), power supply contacts 36 (e.g., studs) of the power supplies 26 align with and contact respective bus bars 28. Accordingly, the bus bars 28 can then carry current from the power supplies 26 to other electronic components. Further details of the invention will now be provided with reference to FIG. 2.

Figure 2:
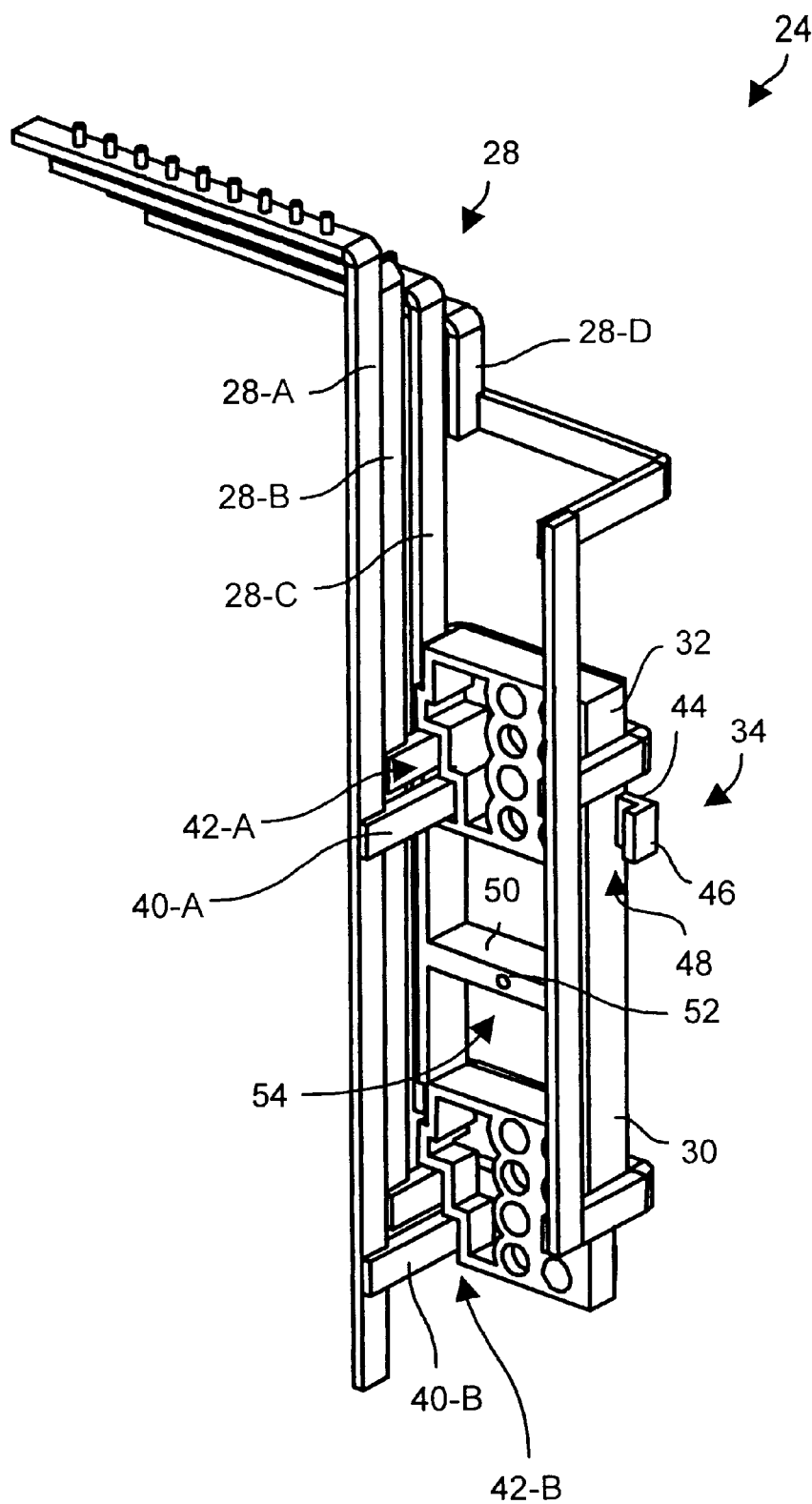
FIG. 2 is a perspective view of a bus bar assembly of the bus bar mounting system of FIG. 1.

FIG. 2 shows a perspective view of the bus bar assembly 24. By way of example only, the set of bus bars 28 includes four bus bars 28-A, 28-B, 28-C, 28-D. The bus bars 28 are made of conductive material (e.g., metal) and can, carry different power supply signals. For example, the bus bar 28-A can carry a +5 Volt DC signal (+5 VDC), the bus bar 28-B can provide the return path for the +5 Volt DC signal (GND), the bus bar 28-C can carry a +12 Volt DC signal (+12 VDC), and the bus bar 28-D can provide the return path for the +12 Volt DC signal (GND).

As shown in FIG. 2, the bus bars 28 include bar portions (e.g., bar portions 40-A, 40-B) that contact block portions (e.g., block portions 42-A, 42-B) of the bus bar block 30. Such contact along with other bus bar portions fastened to the bus bar block 30 enable the bus bar block 30 to hold each bus bar 28 in place in a rigid manner to prevent movement.

As further shown in FIG. 2, the interlocking portion 34 of the bus bar block 30 includes a neck section 44 and an outer section 46. The neck section 44 couples the outer section 46 to the base portion 32 of the bus bar block 30. As will be explained in further detail shortly, the neck section 44 is configured to slidably engage with a groove defined by an interlocking portion of the frame assembly 22. In one arrangement, the base portion 32, the neck section 44 and the outer section 46 together define a rectangular-shaped notch 48 which is configured to receive a section of the interlocking portion of the frame assembly 22 in order to interlock with the frame assembly 22.

As shown in FIG. 2, the bus bar block 30 further includes an alignment portion 50 (i.e., a laterally extending section) that defines an alignment hole 52 and a contact surface 54 (i.e., the underside of the laterally extending section) that is configured to contact the frame assembly 22 when the bus bar assembly 24 is installed onto the frame assembly 22. In one arrangement, the contact surface 54 is substantially flat.

In one arrangement, the bus bar block 30 is formed from a single piece of machined and/or molded plastic. In this arrangement, the base portion 30 and the sections 44, 46 of the interlocking portion 34 form a unitary member (i.e., the interlocking portion 34 is unitary with the base portion 30). The interlocking portion 34 (in its position relative to the base portion 32) is configured to operate as a means for interlocking the bus bar assembly 24 with the frame assembly 22. This arrangement provides substantial material strength around the interlocking portion 34 which is advantageous since the interlocking portion 34 operates as an attachment point between the bus bar block 30 and the frame assembly 22. Further details of the invention will now be provided with reference to FIG. 3.

Figure 3:
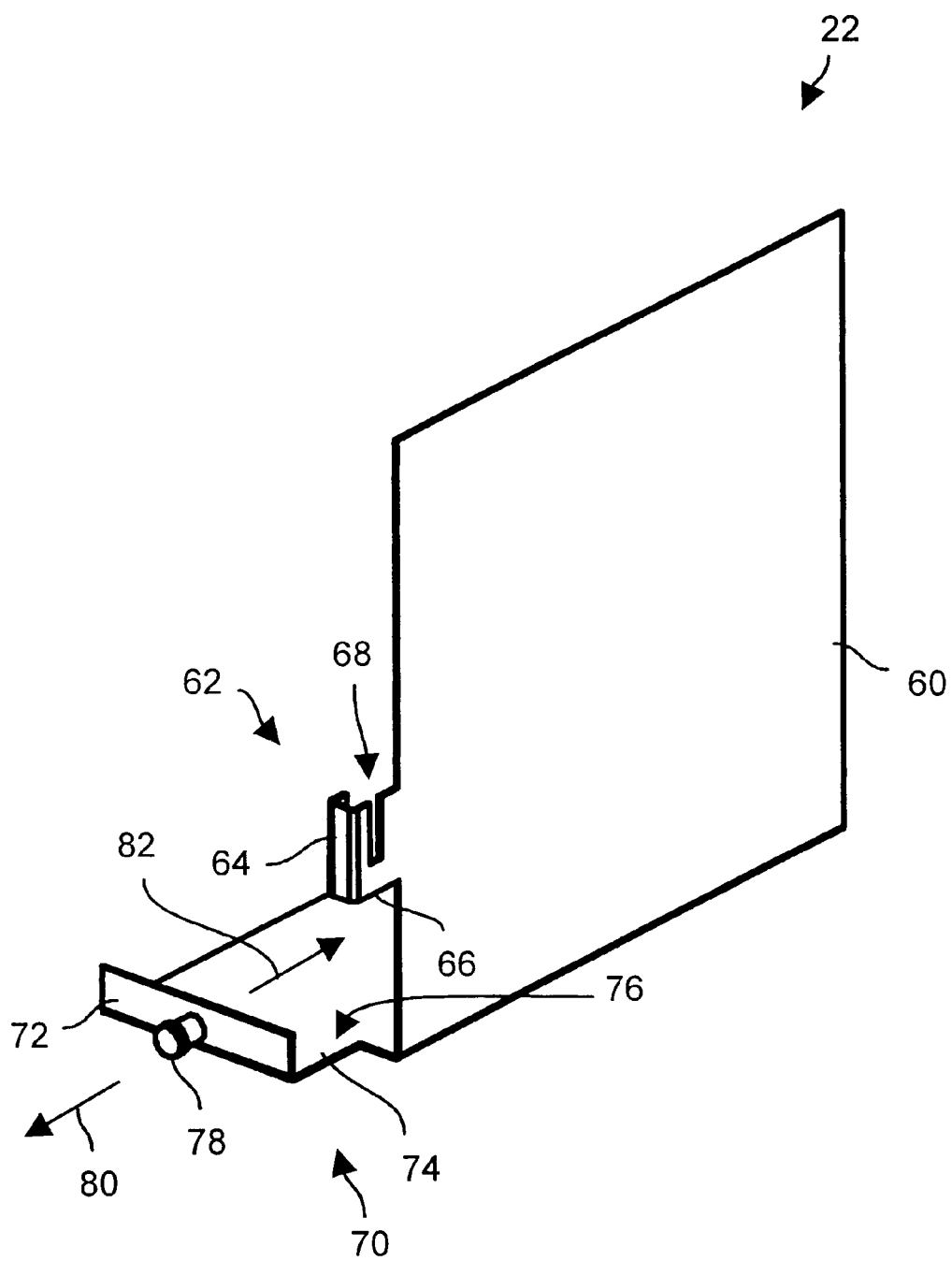
FIG. 3 is a perspective view of a frame assembly of the bus bar mounting system of FIG. 1.

FIG. 3 shows a perspective view of the frame assembly 22. The frame assembly 22 includes a chassis 60 and an interlocking portion 62. The interlocking portion 62 includes an outer section 64 and an intermediate section 66 which connects the outer portion 64 with the chassis 60. The chassis 60, the intermediate section 66 and the outer section 64 together form a rectangular-shaped groove 68. The interlocking portion 62 of the frame assembly 22 is configured to interlock with the interlocking portion 34 of the bus bar block 30. In particular, when the bus bar assembly 24 slidably engages the frame assembly 22, the neck section 44 of the bus bar block interlocking portion 34 (FIG. 2) fits into the rectangular-shaped groove 68 of the frame assembly 22. Simultaneously, the outer section 64 of the frame assembly interlocking portion 62 fits into the rectangular-shaped notch 48 defined by the bus bar block 30. Accordingly, the bus bar block interlocking portion 34 operates as a stabilizer arm, and the frame assembly interlocking portion 62 operates as a stabilizer arm capture which captures and holds the stabilizer arm of the bus bar assembly 24 (i.e., the bus bar block interlocking portion 34). Since the interlocking portions 34, 62 slide together, the bus bar assembly 24 is easier to maneuver during installation than the earlier-described conventional bus bar assembly that requires a user to align the bus bar block with a sub-frame and screw bus bar block tabs to the sub-frame using screws and a screwdriver. Additionally, the user does not need to worry about losing the separate hardware (e.g., screws).

In one arrangement and as shown in FIG. 3, the frame assembly 22 is made of sheet metal which has been stamped and folded. In this arrangement, the outer section 64 of the interlocking portion 62 is bent in a U-shaped mariner for strength, and a snug fit into the rectangular-shaped notch 48 of the bus bar block 30.

As further shown in FIG. 3, the frame assembly 22 further includes an alignment portion 70. The alignment portion 70 includes an outer section 72 and an intermediate section 74 that connects the outer section 72 to the chassis 60. The outer section 72 and the intermediate section 70 form a rectangular shelf 76 which is configured to retain and support the alignment portion 50 of the bus bar block 30 (also see FIG. 2). Additionally, the outer section 72 retains a spring-loaded alignment pin 78 which inserts into the alignment hole 52 defined by the bus bar block alignment portion 50 when the alignment portion 50 rests on the shelf 76 of the frame assembly 22. The diameter of the alignment hole 52 is such that the alignment hole 52 conveniently captures the end of the alignment pin 78 for retention of the bus bar block 30 in the frame assembly 22.

The alignment pin 78 can be made of any reliable and rigid material (e.g., steel, plastic, etc.). As shown in FIG. 3, the spring-loaded alignment pin 78 is movable in a direction 80 (e.g., when pulled away from the outer section 72 by a technician during bus bar assembly installation). Additionally, the spring-loaded alignment pin 78 is movable in a direction 82 which is opposite the direction 80 (e.g., when released by the technician during bus bar assembly installation). Further details of the invention will now be provided with reference to FIGS. 4 through 6.

Figure 4:
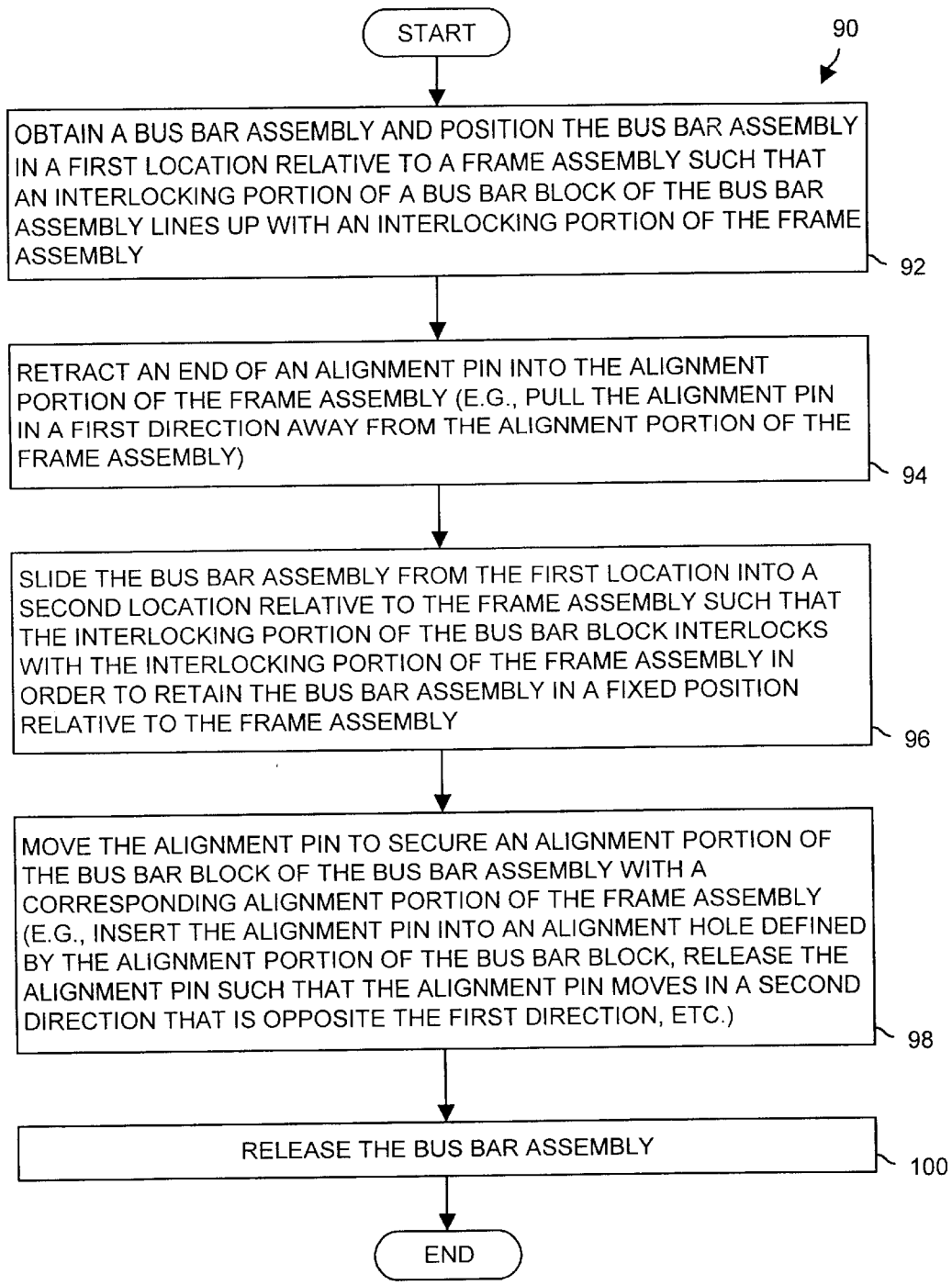
FIG. 4 is a flowchart of a procedure which is performed by a user and/or machinery to mount the bus bar assembly of FIG. 2 to the frame assembly of FIG. 3.
Figure 5:
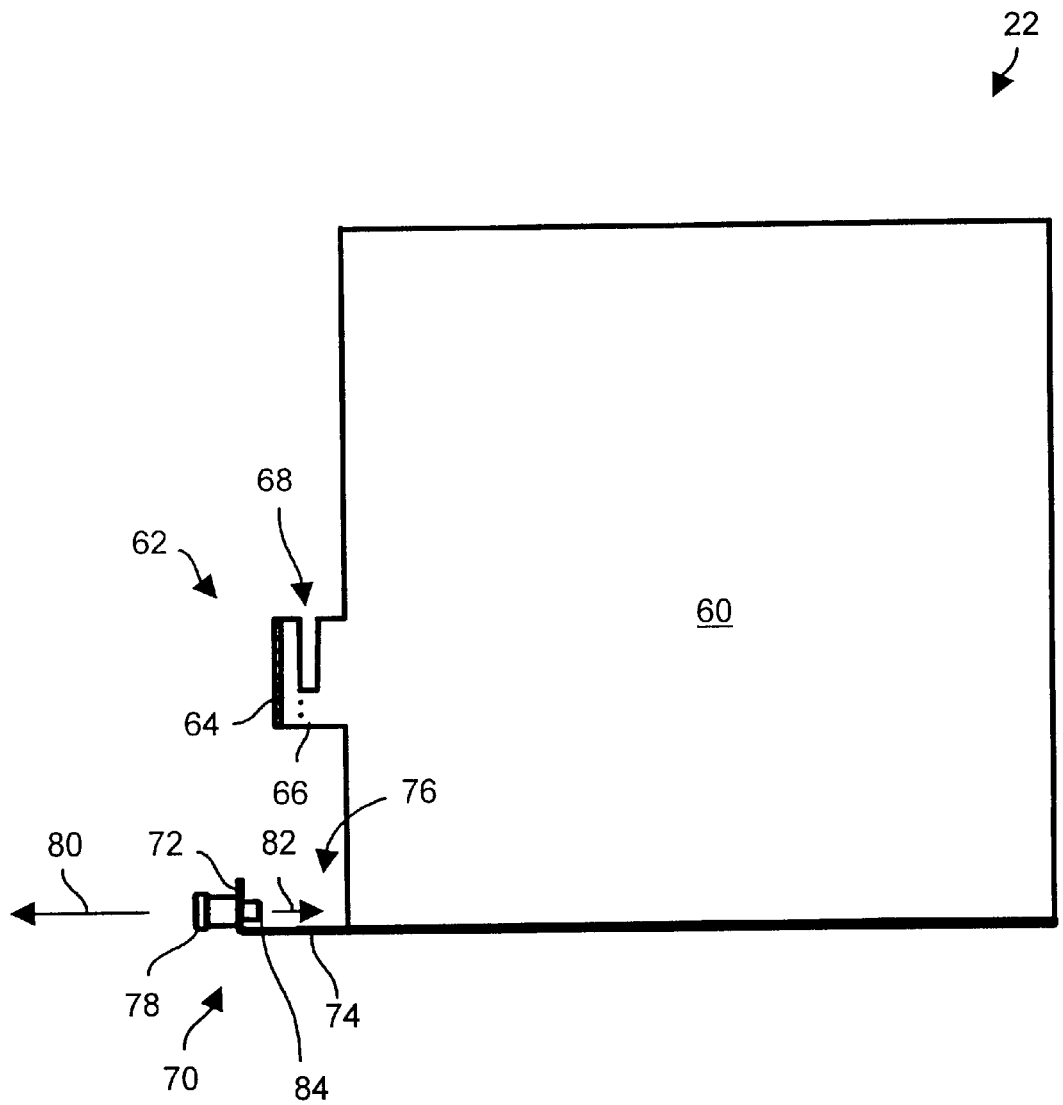
FIG. 5 is a side view of the frame assembly of FIG. 3.
Figure 6:
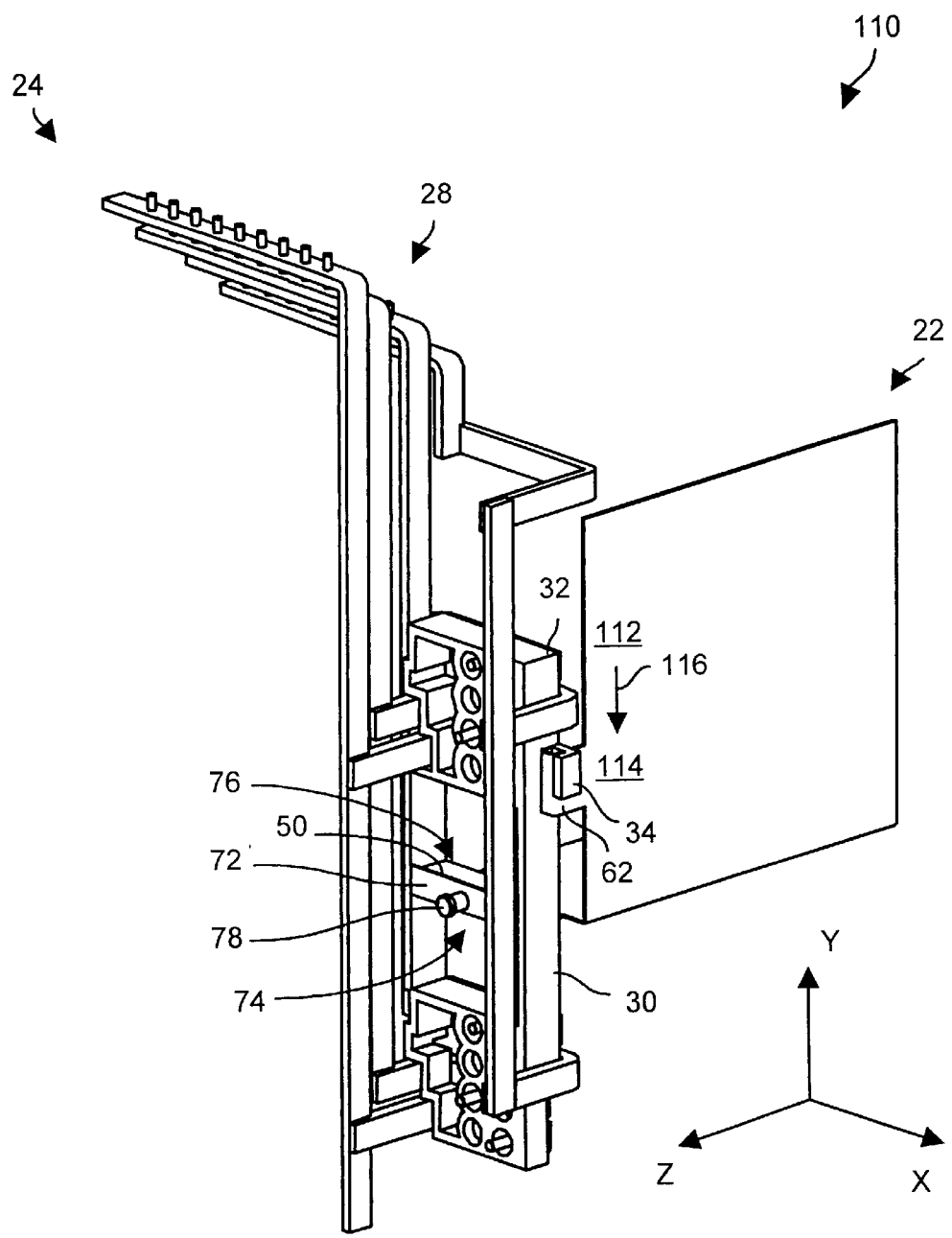
FIG. 6 is a perspective view of the bus bar assembly of FIG. 2 mounted to the frame assembly of FIG. 3.

FIG. 4 shows a procedure 90 which is performed by a user (e.g., a technician) to install the bus bar assembly 24 onto the frame assembly 22. FIG. 5 shows a side view of the frame assembly 22 with the bus bar assembly 24 removed to better show particular features of the frame assembly 22. FIG. 6 shows a perspective view 110 of the bus bar assembly 24 and the frame assembly 22 at a particular installation stage.

In step 92 of the procedure 90 of FIG. 4, the user obtains the bus bar assembly 24 and positions the bus bar assembly 24 in a first location 112 (FIG. 6) relative to the frame assembly 22 such that the interlocking portion 34 of the bus bar block 30 of the bus bar assembly 24 aligns with the interlocking portion 62 of the frame assembly 22. In particular, the user picks up the bus bar assembly 24 (in a pre-assembled state) and places its in contact with the frame assembly 22 such that the interlocking portions 34, 62 line up, and such that the bus bar block alignment portion 50 is disposed just above the frame assembly shelf 76.

In step 94 of FIG. 4, the user retracts an end 84 of the alignment pin 78 into the alignment portion 70 of the frame assembly 22. In particular, the user pulls the alignment pin 78 in the direction 80 (see FIG. 5) such that the end 84 of the alignment pin 78 moves toward the outer section 72. At this point, the alignment pin 78 no longer substantially extends over the frame assembly shelf.76 thus allowing the contact surface 54 (i.e., the underside of the alignment portion 50, also see FIG. 2) to be placed in contact with the shelf 76. In one arrangement, the alignment pin 78 can be moved in the direction 80 so that the end 84 is flush with the surface of the outer section 72.

In step 96 of FIG. 4, the user slides the bus bar assembly 24 from the first location 112 into a second location 114 relative to the frame assembly 22 by moving the bus bar assembly 24 in a downward direction 116 such that the bus bar block interlocking portion 34 interlocks with the frame assembly interlocking portion 62. That is, the user slidably engages the interlocking portions 34, 62 together (the bus bar assembly 24 slides into place relative to the frame assembly 22). Accordingly, the neck section 44 of the bus bar block interlocking portion 34 fits within the rectangular-shaped groove 68 of the frame assembly interlocking portion 62. Concurrently, the outer section 64 of the frame assembly interlocking portion 62 fits within the rectangular-shaped notch 48 defined by the bus bar block 30. Accordingly, the interlocking portions 34, 62 work together to hold the bus bar assembly 24 in place. As a result, the bus bar assembly 24 is now retained in a fixed position relative to the frame assembly 22. It should be understood that this step is relatively effortless since it requires the user to simply hold the bus bar assembly 24 and move it in the downward direction 116 in a relatively short period of time (a second or two). No tools are required for this "quick installation" feature making installation of the bus bar assembly 24 on the frame assembly 22 easier than installation of the earlier-described conventional bus bar assembly on a sub-frame (screwing down bus bar block tabs into a sub-frame).

In step 98, the user moves the alignment pin 78 to secure the bus bar block alignment portion 50 with the frame assembly alignment portion 70. In particular, the user inserts the alignment pin 78 into the alignment hole 52 defined by the bus bar block alignment portion 50 (i.e., moves the alignment pin 78 in the direction 82, see FIG. 5). FIG. 6 shows a perspective view 110 of the bus bar assembly 24, secured to the frame assembly 22. At this point, the bus bar assembly 24 is now properly aligned, stationary, and ready for connection to other components (e.g., a power supply, a backplane, etc.). In one arrangement, when the alignment pin 78 is spring-loaded, the user simply releases the alignment pin 78 such that the alignment pin 78 automatically moves in the direction 82 and into the alignment hole 52 (see FIG. 5). The user does not need to carry or use a special tool (e.g., an electric screwdriver) to secure the bus bar assembly 24 to the frame assembly 22 using the alignment pin 78.

In step 100, the user releases the bus bar assembly. 24. That is, the user lets go of the bus bar assembly 24 and thus leaving the bus bar assembly 24 fastened to the frame assembly 22. At this point, the installation of the bus bar assembly 24 onto the frame assembly 22 is complete. The interlocking portions 34, 62 retain the bus bar assembly 24 in a fixed position relative to the frame assembly 22. Additionally, the alignment pin 78 provides another attachment point thus preventing the bus bar assembly 24 from moving (e.g., from moving in an X, Y or Z direction, see FIG. 6) or substantially twisting or rotating about an axis. For example, the alignment pin 78 prevents the bus bar assembly 24 from turning about the attachment point formed by the interlocking portions 34, 62 (from rotating about the Z-axis in FIG. 6). Accordingly, no damage should result if an incidental force is placed on the bus bar assembly 24 after installation (e.g., if a technician inadvertently pushes against the bus bar assembly 24 while installing another component).

It should be understood that the entire procedure 90 can be completed by a user in only a few seconds (e.g., 30 seconds). The user does not need more time or to hold a large number of items in a cumbersome manner (e.g., a bus bar assembly, screws, a screwdriver, etc.) as in conventional bus bar mounting approaches. Accordingly, the user can install the bus bar assembly 24 onto the frame assembly 22 in less time and in an ergonomically superior manner to conventional approaches.

Figure 7:
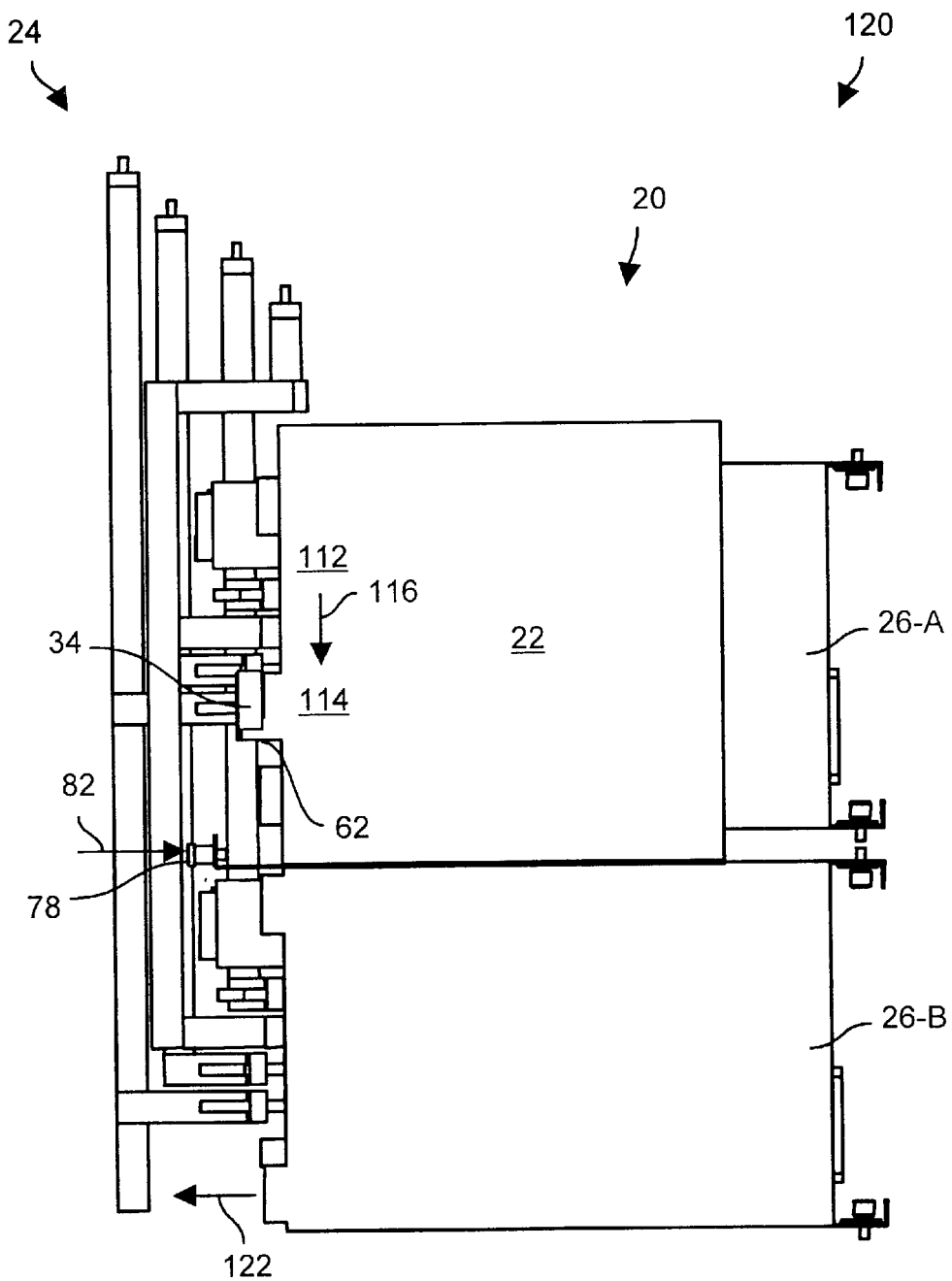
FIG. 7 is a side view of the bus bar mounting system of FIG. 1 with the bus bar assembly mounted to the frame assembly.

After the user has completed the procedure 90, the user can install other components. For example, the user can connect one or more power supplies 26-A, 26-B to the bus bar assembly 24. To this end, and as shown in a side view 120 of the bus bar mounting system 20 of FIG. 7, the user slides the power supplies 26-A, 26-B in a direction 122 toward the bus bar assembly 24 and into contact with the bus bar assembly 24. Additional power supply fastening steps can then be performed to secure the power supplies 26-A, 26-B in place.

As described above, the invention is directed to techniques for mounting a bus bar assembly 24 that is configured to interlock with a frame assembly 22 (e.g., a sub-frame within an electronic cabinet). Such interlocking can alleviate the need for separate hardware (e.g., screws), special tools .(e.g., an electric screwdriver) and substantial installation time (e.g., time to screw a bus bar block of the bus bar assembly into a sub-frame). The features of the invention, as described above, may be employed in data storage system systems, apparatus and procedures, as well as other types of computer systems and devices such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the bus bar assembly mounting system was described as connecting to power supplies 26-A, 26-B to carry DC power supply signals by way of example .only. The bus bar assembly mounting system 20 is suitable for mounting a bus bar assembly that carries signals other than DC power supply signals. For instance, the bus bar assembly 24 can carry AC power supply signals, high direct or alternating non-power supply currents, data signals, backup signals, ground signals, and so on.

Additionally, it should be understood that the bus bar assembly mounting system was described above has connecting with two power supplies 26-A, 26-B by way of example only. Other numbers of power supplies are suitable for use as well. For example, the bus bar assembly mounting system 20 can connect with a single power supply, or several power supplies (e.g., multiple power supplies for N+1 redundancy).

Furthermore, it should be understood that the alignment pin 78 was described as being spring-loaded by way of example only. It is not necessary that the alignment pin 78 be spring-loaded. For example, the alignment pin 78 can be springless thus requiring the user to push the alignment pin 78 in the direction 82 (see FIG. 5) into the alignment hole 52 of the bus bar block alignment portion 50 when securing the bus bar assembly 24 to the frame assembly 22.

Additionally, it should be understood that not all of the steps of the procedure 90 of FIG. 4 are required. For example, if the alignment pin 78 is not spring-loaded, and if the alignment pin 78 is not initially inserted through the outer section 72 over the frame assembly shelf 76, the bus bar assembly 24 is not initially prevented from being rested on the frame assembly shelf 76 by the alignment pin 78. Accordingly, there's no need for step 94 (retracting the alignment pin 78) and the bus bar assembly 24 can simply be placed onto the alignment portion 70.

Furthermore, it should be understood that the procedure 90 of FIG. 4 was described above as being performed by a user (e.g., a technician) by way of example only. The procedure 90 can also be performed by machinery (e.g., automated equipment, robotics, etc.) or combinations thereof. Such modifications and enhancements are intended to be part of embodiments of the invention, and the invention should be limited only by the spirit and scope of the claims.

What is claimed is:

1. A bus bar mounting system, comprising:
   (a) a frame assembly that includes a chassis to mount within an equipment cabinet, and an interlocking portion that forms a unitary member with the chassis; and
   (b) a bus bar assembly that includes a set of bus bars, and a bus bar block, wherein the bus bar block has:
      (i) a base portion, each bus bar of the set of bus bars coupling to the base portion, and
      (ii) an interlocking portion that is configured to interlock with the interlocking portion of the frame assembly in order to retain the bus bar assembly in a fixed position relative to the frame assembly, the interlocking portion of the bus bar block forming a unitary member with the base portion of the bus bar block;
   wherein the chassis and the interlocking portion of the frame assembly are formed by a first contiguous piece of solid material, and wherein the base portion and the interlocking portion of the bus bar block are formed by a second contiguous piece of solid material; and
   wherein the second contiguous piece of solid material is substantially non-conductive to provide a mechanical interlocking connection between the frame assembly and the bus bar block without electrical connectivity between the frame assembly and the bus bar block.

2. The bus bar mounting system of claim 1 wherein the interlocking portion of the bus bar block includes:
   an outer section; and
   a neck section that couples the outer section to the base portion, the neck section being configured to slidably engage with a groove defined by the interlocking portion of the frame assembly.

3. The bus bar mounting system of claim 2 wherein the outer section, the neck section and the base portion of the bus bar block define a rectangular-shaped notch configured to receive a section of the interlocking portion of the frame assembly, wherein the groove defined by the interlocking portion of the frame assembly has a rectangular shape, and wherein the neck section has a rectangular-shaped cross-section in order to engage with the groove to interlock the bus bar assembly with the frame assembly.

4. The bus bar mounting system of claim 1 wherein the frame assembly further includes an alignment portion; wherein the base portion of the bus bar block includes a corresponding alignment portion that aligns with the alignment portion of the frame assembly by way of an alignment pin.

5. The bus bar mounting system of claim 4 wherein the frame assembly further includes:
   a spring loaded alignment pin retained by the alignment portion of the frame assembly; and
wherein the alignment portion of the base portion of the bus bar block includes:
   a laterally extending section that defines (i) a contact surface to rest on the alignment portion of the frame assembly, and (ii) an alignment hole that receives the spring loaded alignment pin retained by the alignment portion of the frame assembly.

6. A bus bar assembly, comprising:
   (a) a set of bus bars; and
   (b) a bus bar block having:
      (I) a base portion, each bus bar of the set of bus bars coupling to the base portion, and
      (ii) an interlocking portion that is configured to interlock with a frame assembly formed by a first contiguous piece of solid material in order to retain the bus bar assembly in a fixed position relative to the frame assembly, the interlocking portion of the bus bar block forming a unitary member with the base portion of the bus bar block;
   wherein the base portion and the interlocking portion of:,the bus bar block are formed by a second contiguous piece of solid material; and
   wherein the second contiguous piece of solid material is substantially non-conductive to provide a mechanical interlocking connection between the frame assembly and the bus bar block without electrical connectivity between the frame assembly and the bus bar block.

7. The bus bar assembly of claim 6 wherein the interlocking portion of the bus bar block includes:
   an outer section; and
   a neck section that couples the outer section to the base portion, the neck section being configured to slidably engage with a groove defined by a portion of the frame assembly.

8. The bus bar assembly of claim 7 wherein the outer section, the neck section and the base portion define a rectangular-shaped notch configured to receive the portion of the frame assembly, and wherein the neck section has a rectangular-shaped cross-section in order to engage with the groove to interlock the bus bar assembly with the frame assembly when the groove has a rectangular shape.

9. The bus bar assembly of claim 6 wherein the base portion includes:
   an alignment portion that aligns with a corresponding alignment portion of the frame assembly by way of an alignment pin.

10. The bus bar assembly of claim 9 wherein the alignment portion of the base portion includes:
   a laterally extending section that defines (i) a contact surface to rest on the alignment portion of the frame assembly, and (ii) an alignment hole that receives a spring loaded alignment pin retained by the alignment portion of the frame assembly.

11. The bus bar assembly of claim 6 wherein at least part of the interlocking portion of the bus bar block is configured to insert into a notch defined by the frame assembly, and wherein the bus bar block defines a notch to receive at least part of an interlocking portion of the frame assembly to interlock the frame assembly with the bus bar assembly.

12. A frame assembly, comprising:
   (a) a chassis to mount within an equipment cabinet; and
   (b) an interlocking portion configured to interlock with a bus bar block of a bus bar block assembly, the interlocking portion forming a unitary member with the chassis;
      wherein the chassis and the interlocking portion of the frame assembly are formed by a first contiguous piece of solid material, and wherein the bus bar block of the bus bar assembly is formed by a second contiguous piece of solid material; and
      wherein the first contiguous piece of solid material is configured to mechanically interlock with the second contiguous piece of solid material without electrical connectivity between the frame assembly and the bus bar block.

13. The frame assembly of claim 12 wherein the interlocking portion of the frame assembly defines a groove to slidably engage with the bus bar block.

14. The frame assembly of claim 13 wherein the interlocking portion of the frame assembly defines a section that inserts into a rectangular-shaped notch of the bus bar block, and wherein the groove defined by the interlocking portion of the frame assembly has a rectangular shape to engage with a portion of the bus bar block having a rectangular-shaped cross-section in order to interlock the bus bar block with the frame assembly.

15. The frame assembly of claim 12, further comprising:
   an alignment portion that aligns with a corresponding alignment portion of the bus bar block by way of an alignment pin.

16. The frame assembly of claim 15, further comprising:
   a spring loaded alignment pin retained by the alignment portion of the frame assembly such that the alignment pin inserts into an alignment hole defined by the alignment portion of the bus bar block when a contact surface defined by the alignment portion of the bus bar block rests on the alignment portion of the frame assembly.

17. The frame assembly of claim 12 wherein at least part of the interlocking portion of the frame assembly is configured to insert into a notch defined by the bus bar block of the bus bar assembly, and wherein the frame assembly defines a notch to receive at least part of an interlocking portion of the bus bar block of the bus bar assembly to interlock the frame assembly with the bus bar assembly.

18. A method for mounting a bus bar assembly to a frame assembly that mounts within an equipment cabinet, the method comprising the steps of:
   (a) obtaining the bus bar assembly and positioning the bus bar assembly in a first location relative to the frame assembly such that an interlocking portion of a bus bar block of the bus bar assembly lines up with an interlocking portion of the frame assembly;
   (b) sliding the bus bar assembly from the first location into a second location relative to the frame assembly such that the interlocking portion of the bus bar block interlocks with the interlocking portion of the frame assembly in order to retain the bus bar assembly in a fixed position relative to the frame assembly, a chassis and the interlocking portion of the frame assembly being formed by a first contiguous piece of solid material, a base portion and the interlocking portion of the bus bar block being formed by a second contiguous piece of solid material, and the step of sliding including the step of:

inserting at least part of the interlocking portion of the bus bar block into a notch defined by the frame assembly, and simultaneously inserting at least part of the interlocking portion of the frame assembly into a notch defined by the bus bar block to interlock the frame assembly with the bus bar assembly; and (c) releasing the bus bar assembly.

19. The method of claim 18, further comprising the step of:

moving an alignment pin to secure an alignment portion of the bus bar block of the bus bar assembly with a corresponding alignment portion of the frame assembly.

20. The method of claim 19 wherein the alignment portion of the frame assembly retains the alignment pin, and wherein the step of moving includes the step of:

inserting the alignment pin into an alignment hole defined by the alignment portion of the bus bar block of the bus bar assembly.

21. The method of claim 20, further comprising the step of:

retracting an end of the alignment pin into the alignment portion of the frame assembly prior to sliding the bus bar assembly from the first location into the second location.

22. The method of claim 21 herein the alignment pin is spring loaded, wherein the step of retracting the end of the alignment pin includes the step of:

pulling the alignment pin in a first direction away from the alignment portion of the frame assembly; and wherein the step of inserting the alignment pin includes the step of:

releasing the alignment pin such that the alignment pin moves in a second direction which is opposite the first direction.

23. The method of claim 18 wherein the second contiguous piece of solid material is substantially non-conductive, and wherein the step of inserting includes the step of:

providing a mechanical interlocking connection between the frame assembly and the bus bar block without electrical connectivity between the frame assembly and the bus bar block.

24. A bus bar mounting system, comprising:

(a) a frame assembly that includes a chassis to mount within an equipment cabinet, and an interlocking portion that forms a unitary member with the chassis; and (b) a bus bar assembly that induces a set of bus bars, and a bus bar block, wherein the bus bar block has:

(i) a base portion, each bus bar of the set of bus bars coupling to the base portion, and (ii) an interlocking portion that is configured to interlock with the interlocking portion of the frame assembly in order to retain the bus bar assembly in a fixed position relative to the frame assembly, the interlocking portion of the bus bar block forming a unitary member with the base portion of the bus bar block;

wherein the chassis and the interlocking portion of the frame assembly are formed by a first contiguous piece of solid material, and wherein the base portion and the interlocking portion of the bus bar block are formed by a second contiguous piece of solid material; and wherein at least part of the interlocking portion of the bus bar block is configured to insert into a notch defined by the frame assembly, and at least part of the interlocking portion of the frame assembly is configured to simultaneously insert into a notch defined by the bus bar block to interlock the frame assembly with the bus bar assembly.

* * * * *

UNITED STATES PATENT AND TRADEMARK OFFICE
CERTIFICATE OF CORRECTION

PATENT NO. : 6,672,914 B1
DATED : January 6, 2004
INVENTOR(S) : Edward Claprood

It is certified that error appears in the above-identified patent and that said Letters Patent is hereby corrected as shown below:

Column 11,
Line 36, "herein" should read -- wherein --.

Signed and Sealed this

Twenty-second Day of June, 2004

JON W. DUDAS
*Acting Director of the United States Patent and Trademark Office*